April 10, 1928.
R. E. SCHIEBER
1,665,934
VALVE
Filed June 9, 1927
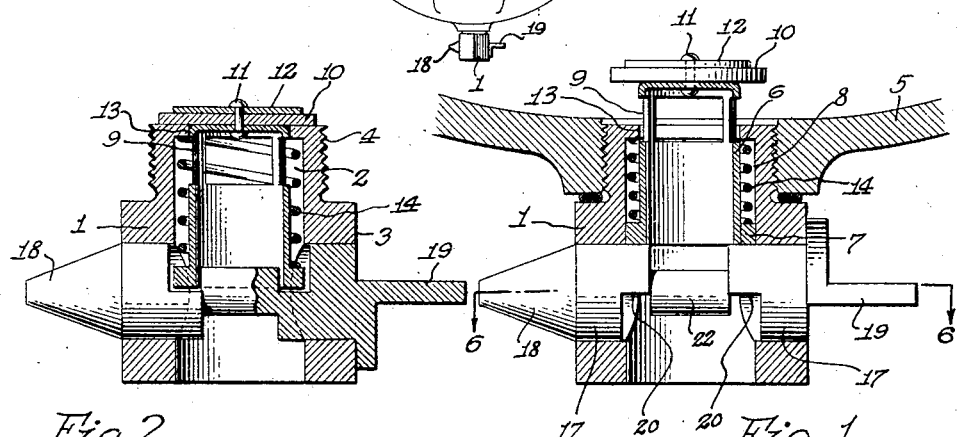
Inventor
Robert E. Schieber,
By Bartlett & Bartlett
Attorneys Patented Apr. 10, 1928.

1,665,934

UNITED STATES PATENT OFFICE.

ROBERT E. SCHIEBER, OF DETROIT, MICHIGAN.

VALVE.

Application filed June 9, 1927. Serial No. 197,559.

The present invention pertains to a novel valve designed particularly for use as a drain cock on the crank case of an automobile.

One of the objects of the invention is to provide a device of this character which may be operated at the most convenient angle relative to the automobile, or at substantially any angle whatever, whereby the final position of the valve in the crank case after being threaded therein is rendered immaterial. This property of the construction is realized chiefly by providing the valve casing with a plurality of angularly spaced openings through any of which the operating member may be inserted.

The operating member comprises preferably a cam receivable in one of the openings and constructed to actuate a ported member slidable in the casing and controlling the flow therethrough. A special member for this purpose is not essential, for in the normal or closed position of the valve the slidable member is exposed at the openings and may be raised by any instrument, such as a screw driver which can enter one of the openings and raise the slidable member.

The invention is fully disclosed in the following description and in the accompanying drawings, in which—

Figure 1 is a longitudinal section of the valve in open position;

Fig. 2 is a similar section showing the valve in closed position;

Fig. 3 is a plan view of the valve;

Fig. 4 is a perspective view of the operating key;

Fig. 5 is an elevation of the device, partly in section, showing the manner of inserting the key;

Fig. 6 is a section on the line 6—6 of Figure 1, showing the key in elevation; and Fig. 7 is an elevation of a crank case showing the valve applied thereto.

Reference to these views will now be made by use of like characters which are employed to designate corresponding parts throughout.

The body of the valve is a casing 1, the interior 2 of which is preferably cylindrical. One end of the casing may be polygonal as indicated by the numeral 3 in Figure 6, while the other end is threaded as at 4 to be screwed into a receptacle 5 such as a crank case.

Within the casing is slidably mounted a thimble 6 having at one end an outer flange 7 which forms an annular space 8 between the thimble and the inner wall of the casing. The upper end of the thimble is ported as at 9 and is adapted to be moved beyond the corresponding end of the casing. This end of the thimble carries a valve head consisting of a disk 10 of suitable material held by a pin 11 and adapted to seat on the end of the casing to close the same. The pin 11 also holds a stiff washer 12 on the top of the disk 10 for maintaining the latter in a rigid condition. The extremity of the casing through which the thimble may pass is formed with an inwardly extending flange 13, and between this flange and the member 7 is inserted a coil spring 14 lying in the annular space 8 and surrounding the intermediate part of the thimble. This spring has a tendency to expand and thereby move the valve head 10 into engagement with the adjacent end of the casing.

The base or polygonal part 3 of the casing is formed with pairs of diametrically opposite apertures 15 as shown in Figure 6. These apertures are provided for the reception of a stem which is mutilated in the manner presently to be described but has two equal and concentric parts 16 and 17 spaced equally to a pair of ports and adapted for reception and rotation therein as also shown in Figure 6. At the outer side of the part 16 is a conical section 18, while at the other part 17 is a turning key 19. The inner ends of the parts 16 and 17 are cut away as at 20 whereby cams 21 are formed. The section of stem between the cams may be of any given shape since it has no operation other than to connect the cams and in the present instance is indicated as a cylindrical member 22.

It will be seen in Figure 2 that when the valve head 10 is on its seat, the lower edge of the thimble 6 lies at the openings 15 and may be seen therethrough if the stem is not in position. In use the valve will close under the action of the spring if the stem is removed. The conical end 18 facilitates insertion of the stem beneath the flange 7 and raising the thimble in order to permit the stem to occupy opposite openings 15 as illustrated in Figure 5. In order to open the valve, the stem is turned by the key 18 whereby to bring the rounded parts of the cam 22 into engagement with the flange 7. If it is desired to close the valve while retaining the stem in the casing, the stem is merely turned to permit the flange 7 to enter the cut-out parts 20.

If the valve is applied to the crank case of an automobile as shown in Figure 7, or is used in any other relation where it is to be opened only for short intervals, the stem may be replaced by any simple instrument adapted to enter one of the openings 15 and raise the thimble against the spring 14. If the stem is used but not retained in the openings at all times, as already described, it may be entered from any angle due to the provision of several pairs of openings 15. The same applies to the operation of the valve by means of a simple pointed instrument other than the specific stem described. If the stem is retained at all times in the casing, the turning key 19 enables it to be conveniently actuated by engagement with a suitable tool such as a pair of pliers, or by hand. Further, in the use of the valve in connection with the crank case of an automobile, in which case access thereto is most readily obtained at a given angle with respect to the automobile, the provision of the several openings 15 enables the actuating member to be set in proper position with respect to such angle independently of the final position acquired by the valve casing after it has been threaded into the container.

Although a specific embodiment of the invention has been illustrated and described, it will be understood that various alterations in the details of construction may be made without departing from the scope of the invention as indicated by the appended claims.

What I claim is:—

1. A valve comprising a casing, a ported member slidable in the casing and adapted for projection beyond one end thereof, a head carried by said member and adapted to close said end, said casing having a plurality of openings, and a cam adapted for reception in any of said openings and to engage said member.

2. A valve comprising a casing, a ported member slidable in the casing and adapted for projection beyond one end thereof, a head carried by said member and adapted to close said end, said casing having pairs of openings, and a cam receivable in any of said pairs and adapted to engage said ported member.

3. A valve comprising a casing and a slidable closure member mounted therein, said casing having a plurality of ports spaced angularly around the same, and a cam receivable selectively in said ports and adapted to actuate said closure member.

In testimony whereof I affix my signature.

ROBERT E. SCHIEBER.